United States Patent
Kim et al.

(10) Patent No.: US 11,523,326 B2
(45) Date of Patent: Dec. 6, 2022

(54) ELECTRONIC APPARATUS AND CONTROL METHOD THEREOF

(71) Applicant: SAMSUNG ELECTRONICS CO., LTD., Suwon-si (KR)

(72) Inventors: Saerome Kim, Suwon-si (KR); Jiung Yu, Suwon-si (KR); Jihoon Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/154,224

(22) Filed: Jan. 21, 2021

(65) Prior Publication Data

US 2021/0258856 A1 Aug. 19, 2021

(30) Foreign Application Priority Data

Feb. 18, 2020 (KR) .................. 10-2020-0019740

(51) Int. Cl.
*H04W 76/38* (2018.01)
*H04W 48/08* (2009.01)
*H04W 48/02* (2009.01)
*H04W 76/10* (2018.01)

(52) U.S. Cl.
CPC ........... *H04W 48/02* (2013.01); *H04W 76/10* (2018.02); *H04W 76/38* (2018.02)

(58) Field of Classification Search
CPC ..... H04W 48/02; H04W 76/10; H04W 76/38; H04W 12/61; H04W 48/20; H04W 84/12; H04W 4/80; H04W 48/08; H04W 88/02; H04W 76/11; H04B 3/544

See application file for complete search history.

(56) References Cited

U.S. PATENT DOCUMENTS

| | | | |
|---|---|---|---|
| 8,345,584 B2* | 1/2013 | Rohfleisch | H04W 72/04 370/328 |
| 10,492,236 B2* | 11/2019 | Li | G06K 7/1417 |
| 10,893,432 B2* | 1/2021 | Mitsui | H04W 16/32 |
| 2010/0085947 A1* | 4/2010 | Ringland | H04W 28/0226 370/338 |
| 2014/0337951 A1* | 11/2014 | Lee | H04L 63/08 726/7 |
| 2015/0181620 A1* | 6/2015 | Seok | H04W 74/0816 370/336 |

(Continued)

FOREIGN PATENT DOCUMENTS

| | | |
|---|---|---|
| CN | 103442097 | 12/2013 |
| JP | 6476523 | 3/2019 |
| KR | 10-1643870 | 8/2016 |

*Primary Examiner* — Andrew Wendell
(74) *Attorney, Agent, or Firm* — Nixon & Vanderhye, P.C.

(57) ABSTRACT

An electronic apparatus is provided. The electronic apparatus includes: a communication interface comprising circuitry and a processor connected with the communication interface and configured to control the electronic apparatus, wherein the processor is configured to, based on identification information of an access point and access information including an access allowance time to the access point being received from another electronic apparatus through the communication interface, connect communication to the access point based on the identification information of the access point, and based on the access allowance time passing, release access to the access point.

14 Claims, 15 Drawing Sheets

(56) References Cited

U.S. PATENT DOCUMENTS

| | | |
|---|---|---|
| 2016/0270020 A1 | 9/2016 | Adrangi et al. |
| 2018/0033008 A1* | 2/2018 | Goto .................... G06Q 20/02 |
| 2019/0014531 A1 | 1/2019 | Fang et al. |
| 2019/0141165 A1* | 5/2019 | Yamada ................ H04W 4/50 |
| 2020/0133985 A1* | 4/2020 | Xiao .................. G06F 16/9536 |
| 2022/0086705 A1* | 3/2022 | Wang ............... H04W 36/0038 |

* cited by examiner

FIG. 1B
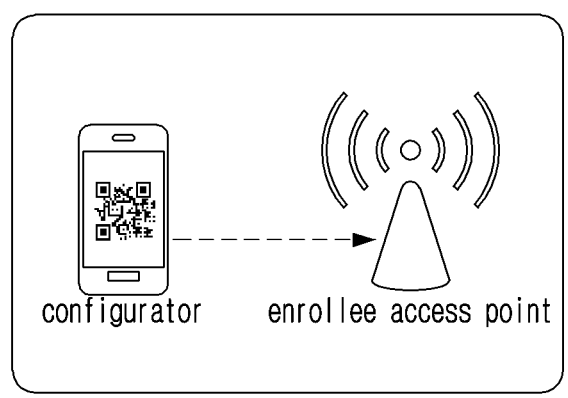
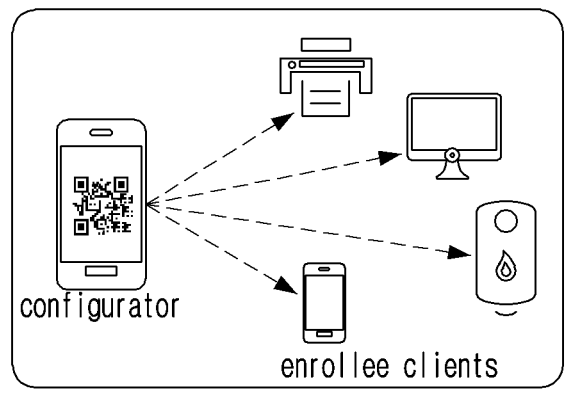
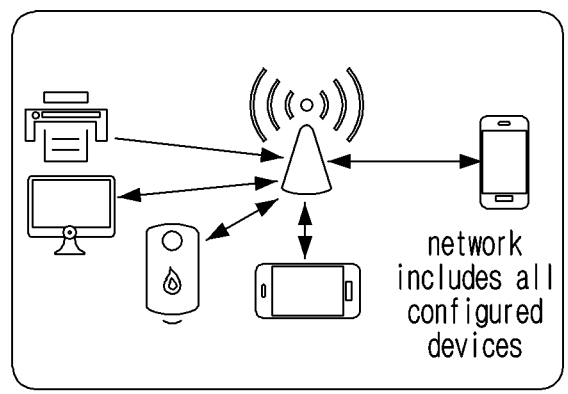

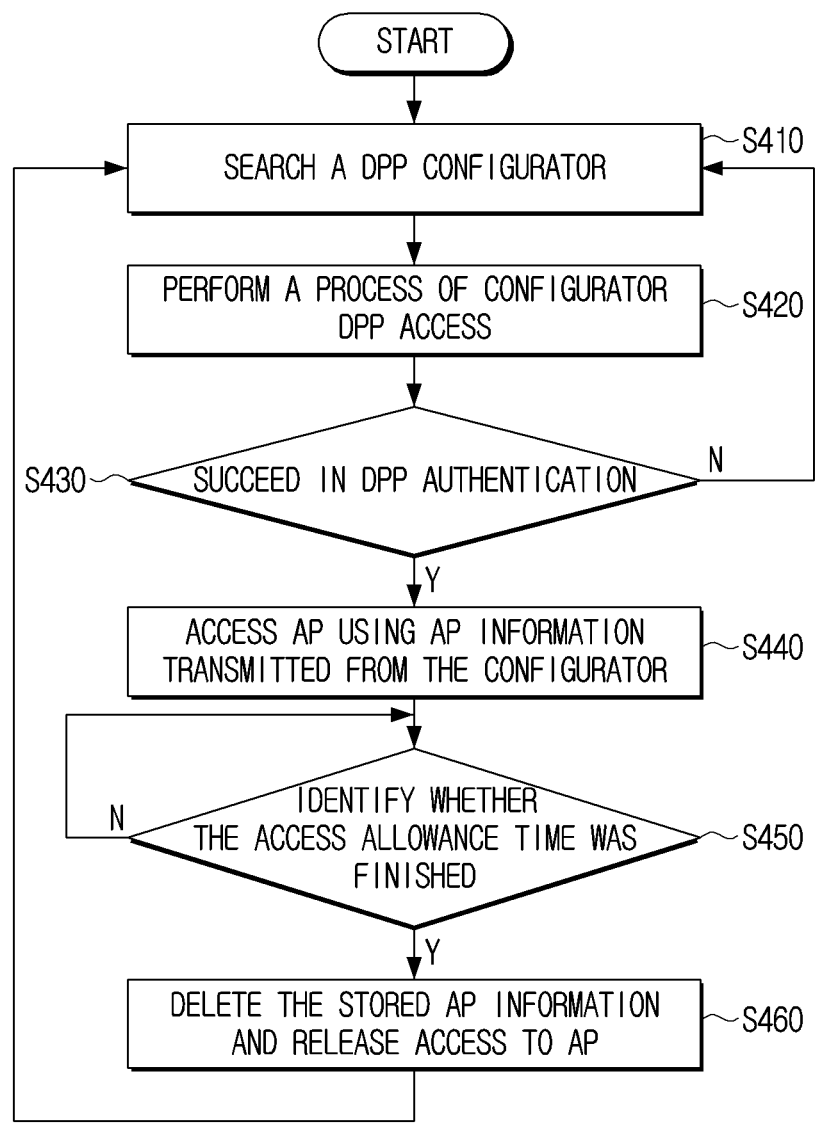

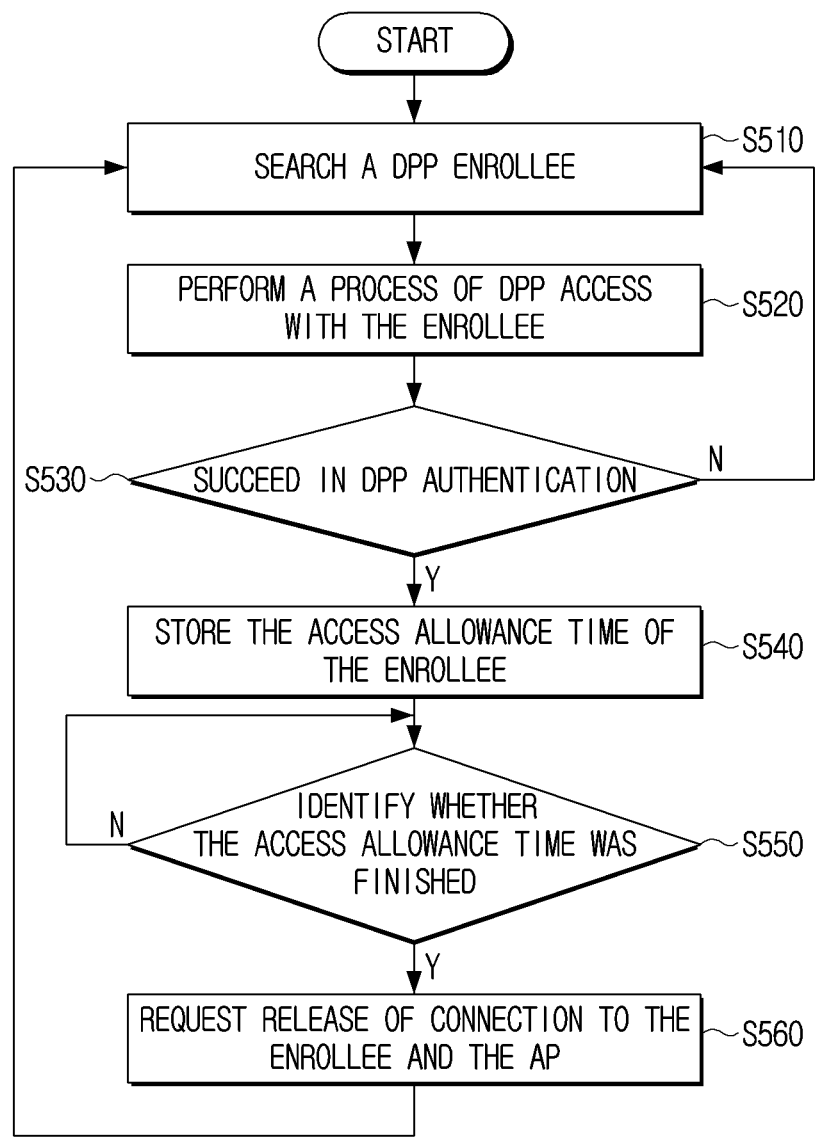

FIG. 9
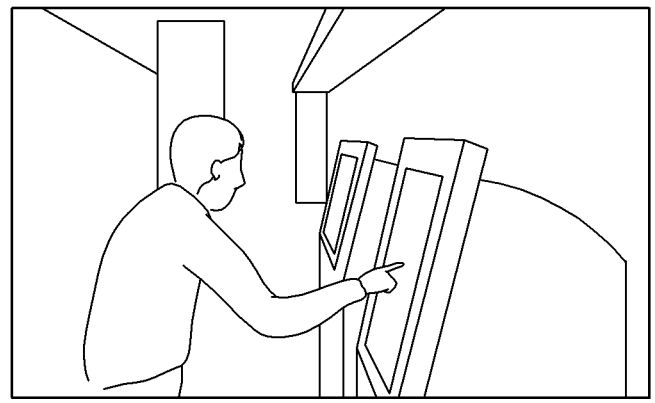
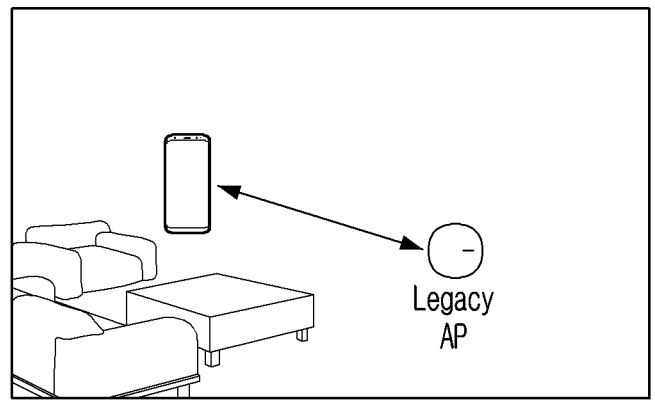
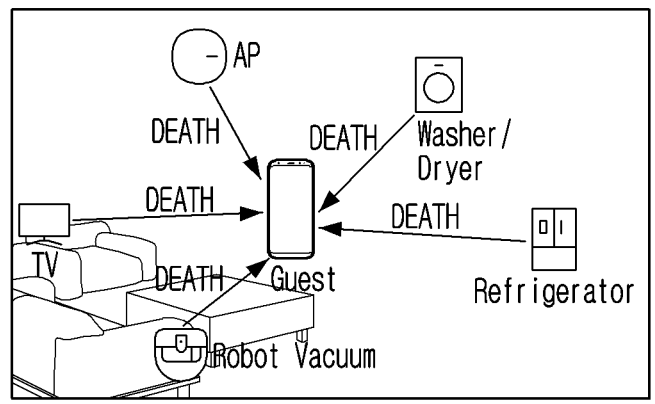

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2020-0019740, filed on Feb. 18, 2020, in the Korean Intellectual Property Office, the disclosure of which is incorporated by reference herein in its entirety.

BACKGROUND

1. Field

The disclosure relates to an electronic apparatus and a control method thereof, and for example, to an electronic apparatus that connects communication between apparatuses, and releases the connected communication, and a control method thereof.

2. Description of Related Art

As electronic apparatuses are being developed rapidly, electronic apparatuses that are capable of exchanging information or data are being used in various ways. For example, an electronic apparatus may perform wireless communication with another electronic apparatus through communication protocols such as wireless fidelity (Wi-Fi).

Also, an electronic apparatus may perform wireless communication with another electronic apparatus by generating a network autonomously without a setting operation of a user. For example, as illustrated in FIG. 1A, if Wi-Fi Easy Connect is used, procedures such as a user having to input a password can be further simplified, and regarding an apparatus wherein a user interface is restrictive, the apparatus can be connected to a Wi-Fi network through scanning of the product QR code.

Explaining through FIG. 1B for more detailed explanation, first, a network owner selects an electronic apparatus (a configurator) as a central configuring point. Here, the electronic apparatus may be an apparatus equipped with an elaborate user interface such as a smartphone or a tablet. However, the electronic apparatus is not limited thereto, and it may be any apparatus that is capable of scanning QR codes and executing the Device Provisioning Protocol (DPP) developed by Wi-Fi Alliance.

The electronic apparatus (configurator) may acquire identification information of an access point by scanning the QR code or identifying the character string of the access point (enrollee access point). Then, the electronic apparatus (configurator) may connect communication with another electronic apparatus by scanning the QR code or identifying the character string of the another electronic apparatus (enrollee clients), and provide the identification information of the access point to the another electronic apparatus. The another electronic apparatus may be connected to the access point based on the received identification information.

To Wi-Fi Easy Connect as described above, a standardized mechanism may be introduced, and provisioning and configuration of Wi-Fi apparatuses may thereby be simplified. Also, Wi-Fi Easy Connect may maintain network security even if a new apparatus is added, by high strength encryption through public key cryptography. In addition, Wi-Fi Easy Connect supports provisioning for WPA2 and WPA3 networks, and also supports a function of replacing an access point without having to re-register all apparatuses to a new access point.

Further, a use time of an access point may be set by adding expiry information as in FIG. 1C. Meanwhile, in the case of an access point supporting up-to-date DPP technologies, the access time can be restricted through expiry information, but in the case of an access point using conventional technologies such as WPA1, WPA2, and WPA3, there is a problem that the access time cannot be restricted. That is, there is a problem that another electronic apparatus (enrollee clients) connected to an access point maintains connection of communication for the access point without limitation on time.

SUMMARY

Embodiments of the disclosure address the aforementioned need, and example embodiments of the disclosure provide an electronic apparatus for setting an access allowance time for an access point, and a control method thereof.

According to an example embodiment of the disclosure, an electronic apparatus includes: a communication interface comprising circuitry and a processor connected with the communication interface and configured to control the electronic apparatus to: based on identification information of an access point and access information including an access allowance time to the access point being received from another electronic apparatus through the communication interface, connect communication to the access point based on the identification information of the access point, and based on the access allowance time passing, release access to the access point.

The processor may be configured to identify the operation type of the access point based on the identification information of the access point, and based on identifying that the access point operates in a legacy standard, delete the identification information of the access point after the access allowance time passed and release access to the access point.

The processor may, based on receiving an instruction for release of access from the another electronic apparatus through the communication interface after the access allowance time passed, be configured to release access to the access point based on the instruction for release of access, and delete the identification information of the access point.

The processor may, based on receiving an instruction for release of access from at least one apparatus connected with the another electronic apparatus through the communication interface after the access allowance time passed, be configured to release access to the access point based on the instruction for release of access, and delete the identification information of the access point.

The processor may be configured to provide identification information of the electronic apparatus to the another electronic apparatus in at least one of a form of a QR code or a form of a character string, and receive the access information from the another electronic apparatus through the communication interface.

According to an example embodiment of the disclosure, an electronic apparatus includes: a communication interface comprising circuitry and a processor configured to: acquire identification information of an access point from the access point, and control the communication interface to transmit the identification information of the access point and access information including an access allowance time to the access point to another electronic apparatus, wherein the processor may, based on identifying that the access point operates in a legacy standard based on the identification information of the access point, include a control instruction for releasing access to the access point after the access allowance time passes in the access information, or control the communication interface to transmit a control instruction for releasing access to the access point to the another electronic apparatus after the access allowance time passes.

The processor may, based on the access allowance time passing after transmitting the access information to the another electronic apparatus, be configured to control the communication interface to transmit an instruction for blocking access for the another electronic apparatus to the access point.

The processor may, based on identification information of the another electronic apparatus being acquired in a form of a QR code or a form of a character string, be configured to perform connection of communication with the another electronic apparatus, and to control the communication interface to transmit the access information to the another electronic apparatus.

The processor may, based on the access allowance time passing after transmitting the access information to the another electronic apparatus, be configured to identify whether connection of communication with the another electronic apparatus is maintained, and based on the connection of communication with the another electronic apparatus being in a released state, control the communication interface to transmit an instruction for controlling at least one apparatus connected with the electronic apparatus to release access between the another electronic apparatus and the access point to the at least one apparatus.

The processor may, based on the connection of communication with the another electronic apparatus being in a released state, be configured to control the communication interface to transmit the identification information for the another electronic apparatus to the at least one apparatus.

The processor may, based on a user instruction for blocking access of the another electronic apparatus to the access point being received, be configured to control the communication interface to transmit an instruction for controlling to release access between the another electronic apparatus and the access point to the access point or at least one apparatus connected with the electronic apparatus.

According to an example embodiment of the disclosure, a method of controlling an electronic apparatus includes: receiving identification information of an access point and access information including an access allowance time to the access point from another electronic apparatus, connecting communication to the access point based on the identification information of the access point, and based on the access allowance time passing, releasing access to the access point.

The method further includes identifying the operation type of the access point based on the identification information of the access point, and in the step of releasing, based on identifying that the access point operates in a legacy standard, the identification information of the access point may be deleted after the access allowance time passed and access to the access point may be released.

The method further includes receiving an instruction for release of access from the another electronic apparatus after the access allowance time passed, and in the releasing, access to the access point may be released based on the instruction for release of access, and the identification information of the access point may be deleted.

The method further includes receiving an instruction for release of access from at least one apparatus connected with the another electronic apparatus after the access allowance time passed, and in the releasing, access to the access point may be released based on the instruction for release of access, and the identification information of the access point may be deleted.

In the \receiving access information, identification information of the electronic apparatus may be provided to the another electronic apparatus in at least one of a form of a QR code or a form of a character string, and the access information may be received from the another electronic apparatus.

According to an example embodiment of the disclosure, a method of controlling an electronic apparatus includes: acquiring identification information of an access point from the access point and transmitting the identification information of the access point and access information including an access allowance time to the access point to another electronic apparatus, wherein the method may further include, based on identifying that the access point operates in a legacy standard based on the identification information of the access point, including a control instruction for releasing access to the access point after the access allowance time passes in the access information and transmitting the control instruction, or based on identifying that the access point operates in a legacy standard based on the identification information of the access point, transmitting a control instruction for releasing access to the access point to the another electronic apparatus after the access allowance time passes.

The method may further include, based on the access allowance time passing after transmitting the access information to the another electronic apparatus, transmitting an instruction for blocking access for the another electronic apparatus to the access point.

In the transmitting, based on identification information of the another electronic apparatus being acquired in a form of a QR code or a form of a character string, connection of communication with the another electronic apparatus may be performed, and the access information may be transmitted to the another electronic apparatus.

The method may further include, based on the access allowance time passing after transmitting the access information to the another electronic apparatus, identifying whether connection of communication with the another electronic apparatus is maintained, and based on the connection of communication with the another electronic apparatus being in a released state, transmitting an instruction for controlling at least one apparatus connected with the electronic apparatus to release access between the another electronic apparatus and the access point to the at least one apparatus.

In the transmitting to the at least one apparatus, the identification information for the another electronic apparatus may be transmitted to the at least one apparatus.

According to the various example embodiments of the disclosure including the above, after the electronic apparatus (enrollee) is connected to the access point, when the access allowance time passes, access to the access point is released, and accordingly, in case the access point operates in a legacy standard, the access allowance time of the electronic apparatus (enrollee) may be restricted.

After the electronic apparatus (configurator) controls the electronic apparatus (enrollee) to be connected to the access point, when the access allowance time passes, connection of communication between the electronic apparatus (enrollee) and the access point is released directly or indirectly, and accordingly, the access allowance time of the electronic apparatus (enrollee) may be restricted.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 1B is a diagram illustrating a problem of the conventional technology;

FIG. 4 is a flowchart illustrating an example active release of access of an electronic apparatus (enrollee) according to various embodiments;

FIG. 5 is a flowchart illustrating an example method for an electronic apparatus (configurator) to release access between an electronic apparatus (enrollee) and an access point according to various embodiments;

FIG. 9 is a diagram illustrating an example of utilization according to various embodiments;

DETAILED DESCRIPTION

Figure 1A:
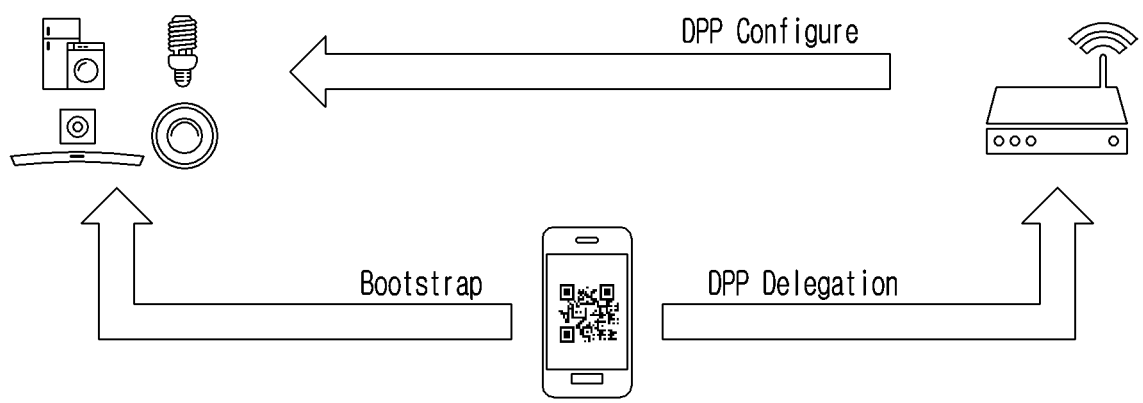
FIG. 1A is a diagram illustrating a problem of the conventional technology.
Figure 1C:
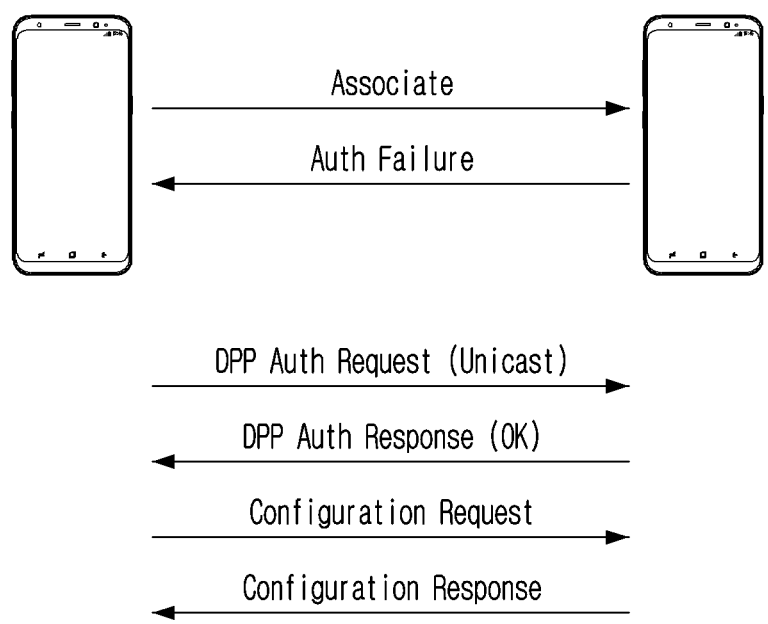
FIG. 1C is a diagram illustrating a problem of the conventional technology.

Various example embodiments of the present disclosure may be diversely modified. Accordingly, example embodiments are illustrated in the drawings and are described in greater detail in the detailed description. However, it is to be understood that the present disclosure is not limited to a specific example embodiment, but includes all modifications, equivalents, and substitutions without departing from the scope and spirit of the present disclosure. Well-known functions or constructions may not be described in detail where they might obscure the disclosure with unnecessary detail.

Hereinafter, the disclosure will be described in detail with reference to the accompanying drawings.

As terms used in the embodiments of the disclosure, general terms that are currently used widely were selected as far as possible, in consideration of the functions in the disclosure. However, the terms may vary depending on the intention of those skilled in the art who work in the pertinent field, previous court decisions, or emergence of new technologies. In particular cases, there may be terms that were arbitrarily selected, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

In this disclosure, expressions such as "have," "may have," "include," and "may include" should be construed as denoting that there are such characteristics (e.g., elements such as numerical values, functions, operations, and components), and the expressions are not intended to exclude the existence of additional characteristics.

The expression "at least one of A and/or B" should be interpreted to include one of "A" or "B" or "A and B."

In addition, the expressions "first," "second," and the like used in this disclosure may be used to describe various elements regardless of any order and/or degree of importance. Also, such expressions may be used to distinguish one element from another element, and are not intended to limit the elements.

Singular expressions include plural expressions, as long as they do not conflict with the context. In addition, in the disclosure, terms such as "include" and "consist of" should be understood as designating that there are such characteristics, numbers, steps, operations, elements, components or a combination thereof described in the disclosure, but not as excluding in advance the existence or possibility of adding one or more of other characteristics, numbers, steps, operations, elements, components or a combination thereof.

In this disclosure, the term "user" may refer to a person who uses an electronic apparatus or an apparatus using an electronic apparatus (e.g.: an artificial intelligence electronic apparatus).

Hereinafter, various example embodiments of the disclosure will be described in greater detail with reference to the accompanying drawings.

Figure 2A:
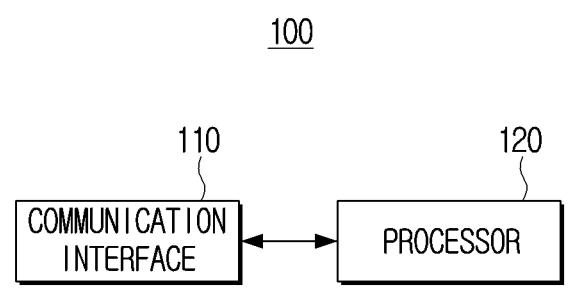
FIG. 2A is a block diagram illustrating an example configuration of an electronic apparatus (enrollee) according to various embodiments.

FIG. 2A is a block diagram illustrating an example hardware configuration of an electronic apparatus (enrollee) 100 according to various embodiments.

The electronic apparatus 100 may, for example, be an apparatus that accesses an access point (AP), and it may be an apparatus such as a smartphone, a tablet PC, a laptop computer, etc. However, the disclosure is not limited thereto, and the electronic apparatus 100 may be any apparatus that can perform communication with an access point. An access point may refer, for example, to an apparatus that helps to connect an apparatus that can perform wireless communication to a network.

According to FIG. 2A, the electronic apparatus 100 includes a communication interface (e.g., including communication circuitry) 110 and a processor (e.g., including processing circuitry) 120. However, the disclosure is not limited thereto, and the electronic apparatus 100 may be implemented in a form wherein some components have been excluded.

The communication interface 110 may include various communication circuitry and perform communication with external apparatuses in various types according to communication methods in various types. For example, the electronic apparatus 100 may perform communication with an electronic apparatus (configurator) 200 or an access point through the communication interface 110.

The communication interface 110 may include various modules including various circuitry, such as, for example, and without limitation, a Wi-Fi module, a Bluetooth module, an infrared communication module, and a wireless communication module, etc. Here, each communication module may be implemented in the form of at least one hardware chip.

A Wi-Fi module and a Bluetooth module may perform communication using a Wi-Fi method and a Bluetooth method, respectively. In the case of using a Wi-Fi module or a Bluetooth module, various types of connection information such as an SSID and a session key is transmitted and received first, and connection of communication is performed using the information, and various types of information can be transmitted and received thereafter. An infrared communication module performs communication according to an infrared Data Association (IrDA) technology of transmitting data to a near field wirelessly using infrared rays between visible rays and millimeter waves.

A wireless communication module may include at least one communication chip including various communication circuitry that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc. other than the aforementioned communication methods.

In addition to the above, the communication interface may include at least one of a Local Area Network (LAN) module, an Ethernet module, or a wired communication module performing communication using a pair cable, a coaxial cable, or an optical fiber cable, etc.

The processor 120 may include various processing circuitry and controls the overall operations of the electronic apparatus 100. Specifically, the processor 120 may be connected with each component of the electronic apparatus 100 and control the overall operations of the electronic apparatus 100. For example, the processor 120 may be connected with components such as the communication interface 110, a memory (not shown), a display (not shown), etc. and control the operations of the electronic apparatus 100.

According to an embodiment of the disclosure, the processor 120 may be implemented, for example, and without limitation, as a digital signal processor (DSP), a dedicated processor, a microprocessor, and a time controller (TCON). However, the disclosure is not limited thereto, and the processor 120 may include one or more of a central processing unit (CPU), a micro controller unit (MCU), a micro processing unit (MPU), a controller, an application processor (AP) or a communication processor (CP), and an ARM processor, or may be defined by the terms. The processor 120 may be implemented as a system on chip (SoC) having a processing algorithm stored therein or large scale integration (LSI), or in the form of a field programmable gate array (FPGA).

When identification information of an access point and access information including an access allowance time to the access point are received from the electronic apparatus 200 through the communication interface 110, the processor 120 may connect communication to the access point based on the identification information of the access point, and when the access allowance time passes, the processor 120 may release access to the access point.

Figure 2B:
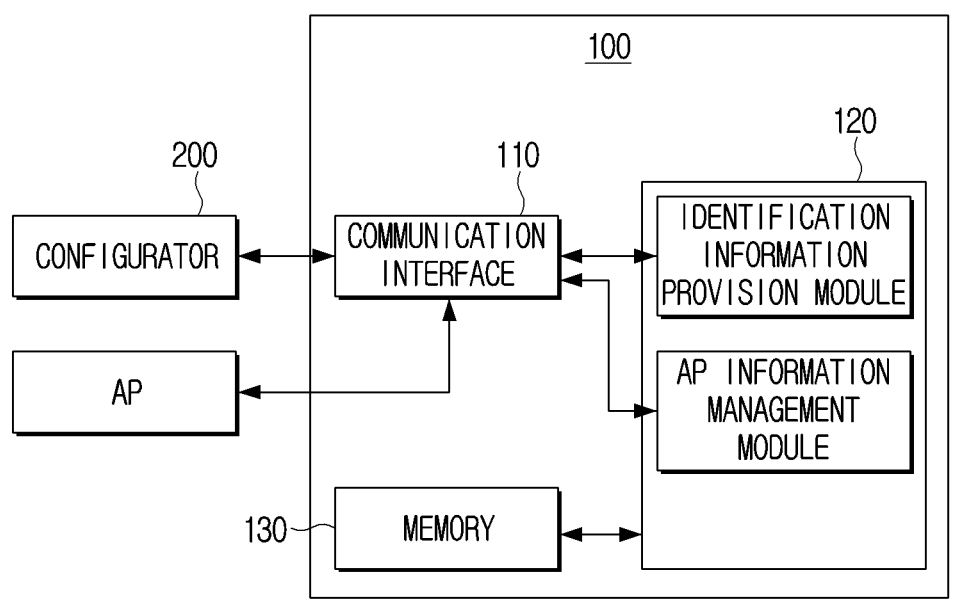
FIG. 2B is a block diagram illustrating an example software configuration of an electronic apparatus (enrollee) according to various embodiments.

Such an operation of the processor 120 will be described in greater detail below with reference to FIG. 2B.

FIB. 2B is a block diagram illustrating an example software configuration of the electronic apparatus 100 according to various embodiments. In FIG. 2B, a plurality of modules are illustrated as being located inside the processor 120 to indicate, by way of example, a state wherein a plurality of modules are loaded (or executed) by the processor 120 and operate in the processor 120, and the plurality of modules may have been stored in the memory 130 in advance.

The processor 120 may control the overall operations of the electronic apparatus 100 by executing modules or instructions stored in the memory 130. For example, the processor 120 may read and interpret modules or instructions and determine a sequence for data processing, and in accordance thereto, the processor 120 may transmit a control signal for controlling the operations of the other components such as the memory 130, etc., and thereby control the operations of the other components.

The processor 120 may read identification information of the electronic apparatus 100 stored in the memory 130 by executing an identification information provision module, and provide the identification information of the electronic apparatus 100 to the electronic apparatus (e.g., configurator) 200. For example, the processor 120 may express the identification information of the electronic apparatus 100 in at least one of a form of a QR code or a form of a character string and provide the information to the electronic apparatus 200. In this case, the electronic apparatus 100 may further include a display (not shown), and the processor 120 may control the display to display at least one of a QR code or a character string corresponding to the identification information of the electronic apparatus 100.

The display may include a component outputting various kinds of video data processed at the processor 120. The display may be implemented as displays in various forms such as, for example, and without limitation, a liquid crystal display (LCD), an organic light emitting diodes (OLED) display, a plasma display panel (PDP), a micro LED, a laser display, VR, Glass, etc. In the display, driving circuits that may be implemented in forms such as an a-si TFT, a low temperature poly silicon (LTPS) TFT, and an organic TFT (OTFT), a backlight unit, etc. may also be included. Meanwhile, the display may be implemented as a touch screen combined with a touch sensor, a flexible display, a 3D display, etc.

However, the disclosure is not limited thereto, and the electronic apparatus 100 may provide identification information to the electronic apparatus 200 without an identification information provision module. For example, the electronic apparatus 100 may include an exterior on which at least one of a QR code or a character string corresponding to identification information of the electronic apparatus 100 is imprinted.

The processor 120 may provide identification information of the electronic apparatus 100 to the electronic apparatus 200, and receive access information for accessing the access point from the electronic apparatus 200 through the communication interface 110. The access information may include identification information of the access point and the access allowance time to the access point.

The processor 120 may store the access information in the memory 130 by executing an AP information management module, and connect communication to the access point based on the identification information of the access point. Then, when the access allowance time passes, the processor 120 may release access to the access point.

For example, the processor 120 may identify the operation type of the access point based on the identification information of the access point, and if it is identified that the access point operates in a legacy standard, the processor 120 may delete the identification information of the access point after the access allowance time passes, and thereby release access to the access point. For example, if it is identified that the access point is not an access point supporting a DPP technology, the processor 120 may actively release access with the access point after the access allowance time stored in the memory 130 passes. Here, the access allowance time may be an absolute time, or it may be a relative time. For example, the access allowance time may be an absolute time like 6 p.m., or it may be a relative time like one hour after the time of accessing the access point.

The processor 120 may receive an instruction for release of access from the electronic apparatus 200 through the communication interface 110 after the access allowance time passes. In this case, the processor 120 may release access to the access point based on the received instruction for release of access, and delete the identification information of the access point.

The processor 120 may receive an instruction for release of access from at least one apparatus connected with the electronic apparatus 200 through the communication interface 110 after the access allowance time passes. The processor 120 may release access to the access point based on the received instruction for release of access, and delete the identification information of the access point. For example, in case it is a situation wherein the electronic apparatus 200 cannot directly provide an instruction for release of access to the electronic apparatus 100, the electronic apparatus 200 may identify at least one apparatus that can communicate with the electronic apparatus 200, and transmit an instruction for controlling the at least one apparatus to release access between the electronic apparatus 100 and the access point to the at least one apparatus. Then, the at least one apparatus may transmit the instruction for release of access to the electronic apparatus 100.

As described above, the electronic apparatus 100 may actively release access with the access point, or release access with the access point by receiving an instruction for release of access. By virtue of this, the access allowance time of the electronic apparatus 100 can be restricted even in case the access point does not support a DPP technology.

Figure 3A:
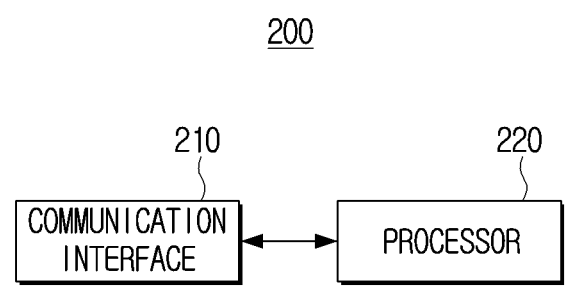
FIG. 3A is a block diagram illustrating an example configuration of an electronic apparatus (configurator) according to various embodiments.

FIG. 3A is a block diagram illustrating an example hardware configuration of the electronic apparatus (configurator) 200 according to various embodiments.

The electronic apparatus 200 is an apparatus including a network, and for example, it may be an apparatus that provides authority for the electronic apparatus 100 to access the access point. For example, the electronic apparatus 200 may include, for example, an apparatus such as a smartphone, a tablet PC, a laptop computer, etc. In particular, the electronic apparatus 200 may be an apparatus that can identify a QR code or a character string for acquiring identification information of the electronic apparatus 100. However, the disclosure is not limited thereto, and the electronic apparatus 200 can be any apparatus that includes a network.

According to FIG. 3A, the electronic apparatus 200 includes a communication interface (e.g., including communication circuitry) 210 and a processor (e.g., including processing circuitry) 220. However, the disclosure is not limited thereto, and the electronic apparatus 200 may be implemented in a form wherein some components have been excluded.

The communication interface 210 may include various communication circuitry for performing communication with external apparatuses in various types according to communication methods in various types. For example, the electronic apparatus 200 may perform communication with the electronic apparatus (enrollee) 100 or the access point through the communication interface 210.

The communication interface 210 may include various modules including various communication circuitry, such as, for example, and without limitation, a Wi-Fi module, a Bluetooth module, an infrared communication module, and a wireless communication module, etc. Each communication module may be implemented in the form of at least one hardware chip.

A Wi-Fi module and a Bluetooth module perform communication using a Wi-Fi method and a Bluetooth method, respectively. In the case of using a Wi-Fi module or a Bluetooth module, various types of connection information such as an SSID and a session key is transmitted and received first, and connection of communication is performed using the information, and various types of information can be transmitted and received thereafter. An infrared communication module performs communication according to an infrared Data Association (IrDA) technology of transmitting data to a near field wirelessly using infrared rays between visible rays and millimeter waves.

A wireless communication module may include at least one communication chip that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc. other than the aforementioned communication methods.

The communication interface may include at least one of a Local Area Network (LAN) module, an Ethernet module, or a wired communication module performing communication using a pair cable, a coaxial cable, or an optical fiber cable, etc.

The processor 220 may include various processing circuitry and controls the overall operations of the electronic apparatus 200. Specifically, the processor 220 may be connected with each component of the electronic apparatus 200 and control the overall operations of the electronic apparatus 200. For example, the processor 220 may be connected with components such as the communication interface 210, a memory (not shown), a camera (not shown), etc. and control the operations of the electronic apparatus 200.

According to an embodiment of the disclosure, the processor 220 may be implemented as a digital signal processor (DSP), a dedicate processor, a microprocessor, and a time controller (TCON). However, the disclosure is not limited thereto, and the processor 220 may include one or more of a central processing unit (CPU), a micro controller unit (MCU), a micro processing unit (MPU), a controller, an application processor (AP) or a communication processor (CP), and an ARM processor, or may be defined by the terms. Also, the processor 220 may be implemented as a system on chip (SoC) having a processing algorithm stored therein or large scale integration (LSI), or in the form of a field programmable gate array (FPGA).

The processor 220 may acquire identification information of the access point from the access point, and transmit access information including the identification information of the access point and the access allowance time to the access point to the electronic apparatus 100.

The processor 220 may perform an operation for releasing access between the electronic apparatus 100 and the access point, and more detailed explanation in this regard will be made below with reference to FIG. 3B.

Figure 3B:
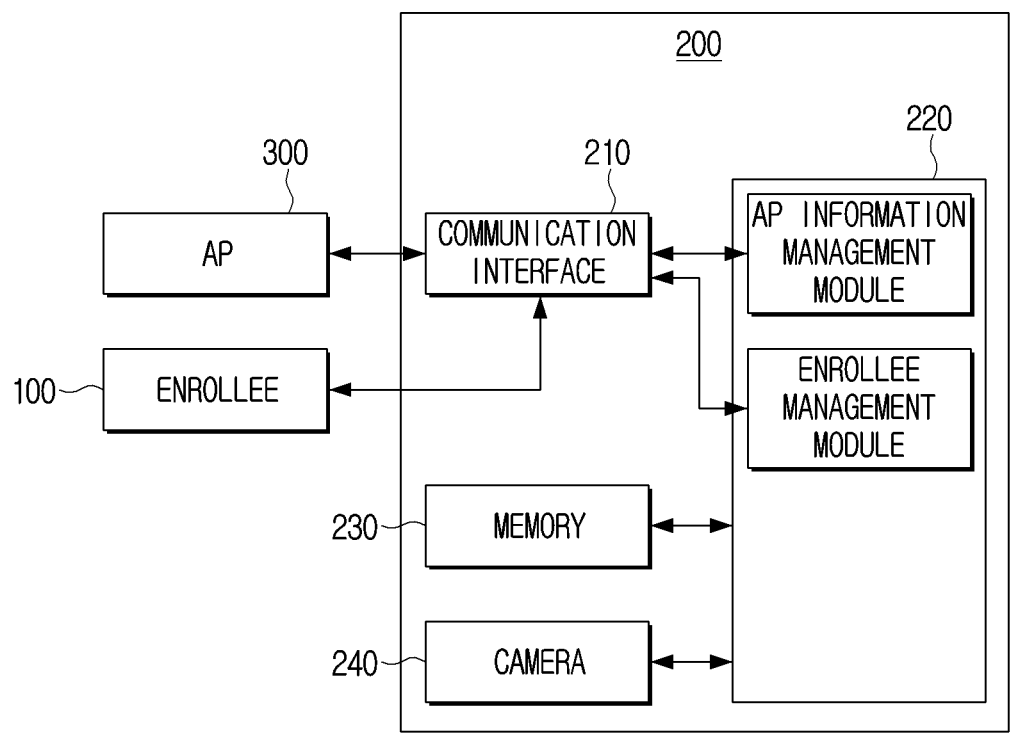
FIG. 3B is a block diagram illustrating an example software configuration of an electronic apparatus (configurator) according to various embodiments.

FIG. 3B is a block diagram for illustrating an example software configuration of the electronic apparatus 200 according to various embodiments. In FIG. 3B, a plurality of modules are located inside the processor 220 for indicating, by way of example, a state wherein a plurality of modules are loaded (or executed) by the processor 220 and operate in the processor 220, and the plurality of modules may have been stored in the memory 230 in advance.

The processor 220 may control the overall operations of the electronic apparatus 200 by executing modules or instructions stored in the memory 230. For example, the processor 220 may read and interpret modules or instructions and determine a sequence for data processing, and in accordance thereto, the processor 220 may transmit a control signal for controlling the operations of the other components such as the memory 230, etc., and thereby control the operations of the other components.

The processor 220 may perform an operation for acquiring identification information of the access point by executing the AP information management module. For example, the electronic apparatus 200 may further include a camera 240, and the processor 220 may control the camera 240 to photograph a QR code or a character string described on the access point. Then, the processor 220 may acquire identification information of the access point from the photographed image. The processor 220 may store the identification information of the access point in the memory 230.

The processor 220 may control the communication interface 210 to transmit the identification information of the access point and access information including the access allowance time to the access point to the electronic apparatus 100 by executing an enrollee management module. For example, when identification information of the electronic apparatus 100 is acquired, the processor 220 may control the communication interface 210 to transmit the identification information of the access point and access information including the access allowance time to the access point to the electronic apparatus (e.g., enrollee) 100. Here, the access allowance time may be information that was set in advance by the user of the electronic apparatus 200 and stored in the memory 230. The processor 220 may acquire identification information of the electronic apparatus 100 in a form of a QR code or a form of a character string.

If it is identified that the access point operates in a legacy standard based on the identification information of the access point, the processor 220 may include a control instruction for releasing access to the access point after the access allowance time passes in the access information.

For example, if it is identified that the access point is not an access point supporting a DPP technology based on the identification information of the access point, the processor 220 may include a control instruction in the access information and transmit the access information, and the processor 220 does not perform any operation after transmitting the access information. A control instruction may include an instruction for making the electronic apparatus 100 release access to the access point after the access allowance time passes. For example, the electronic apparatus 100 may directly identify whether the access allowance time passes, and if the access allowance time passes, the electronic apparatus 100 may release access to the access point.

In this case, the processor 220 just transmits the access information to the electronic apparatus 100 at a specific time point, and does not perform an additional operation. The electronic apparatus 100 may actively identify whether the access allowance time passed, and release connection with the access point even if a control instruction is not additionally received.

If it is identified that the access point operates in a legacy standard based on the identification information of the access point, the processor 220 may control the communication interface 210 to transmit a control instruction for releasing access to the access point to the electronic apparatus 100 after the access allowance time passes.

For example, if it is identified that the access point is not an access point supporting a DPP technology based on the identification information of the access point, the processor 220 may transmit the access information to the electronic apparatus 100, and when the access allowance time passes, the processor 220 may transmit a control instruction for releasing access to the access point to the electronic apparatus 100.

For example, the processor 220 may transmit the access information to the electronic apparatus 100 at a specific time point, and additionally transmit a control instruction to the electronic apparatus 100 at a time point when the access allowance time passed after the specific time point, and thus the processor 220 may provide information or a control instruction to the electronic apparatus 200 through two time points in total. In this case, the electronic apparatus 100 may not actively identify whether the access allowance time passed, and release connection with the access point only in case a control instruction was additionally received from the electronic apparatus 200.

The processor 220 may block access of the electronic apparatus 100 through the access point. For example, if the access allowance time passes after transmitting the access information to the electronic apparatus 100, the processor 220 may control the communication interface 210 to transmit an instruction for blocking access for the electronic apparatus 100 to the access point. In this case, even if the electronic apparatus 100 requests transmission of data to the access point, the access point may not perform any operation.

If the access allowance time passes after transmitting the access information to the electronic apparatus 100, the processor 220 may identify whether connection of communication with the electronic apparatus 100 is maintained, and if it is a state wherein connection of communication with the electronic apparatus 100 has been released, the processor 220 may control the communication interface 210 to transmit an instruction for controlling at least one apparatus connected with the electronic apparatus 200 to release access between the electronic apparatus 100 and the access point to the at least one apparatus. In this case, the processor 220 may control the communication interface 210 to transmit identification information for the electronic apparatus 100 to the at least one apparatus.

For example, as the location of the electronic apparatus 100 is moved after receiving the access information, connection of communication of the electronic apparatus 100 may be released. In this case, the processor 220 may control the communication interface 210 to transmit an instruction for controlling at least one apparatus connected with the electronic apparatus 200 to release access between the electronic apparatus 100 and the access point and the identification information for the electronic apparatus 100 to the at least one apparatus. For example, if the electronic apparatus 100 is in a state of being connected with a first smartphone and a second smartphone, each of the first smartphone and the second smartphone may make an attempt to connect communication with the electronic apparatus 100 based on the identification information for the electronic apparatus 100. If only the first smartphone between the two smartphones is connected to the electronic apparatus 100, the first smartphone may transmit a control instruction for releasing access to the access point to the electronic apparatus 100, and the electronic apparatus 100 may release access to the access point based on the received control instruction.

If a user instruction for blocking access of the electronic apparatus 100 for the access point is received, the processor 220 may control the communication interface 210 to transmit an instruction for controlling to release access between the electronic apparatus 100 and the access point to the access point or at least one apparatus connected with the electronic apparatus 200.

As described above, the electronic apparatus 200 may release access between the electronic apparatus 100 and the access point by various methods, and by virtue of this, the access allowance time of the electronic apparatus 100 can be restricted even in case the access point does not support a DPP technology.

Hereinafter, various example embodiments of the disclosure will be described in greater detail below with reference to the drawings.

FIG. 4 is a flowchart illustrating an example active release of access of the electronic apparatus 100 according to various embodiments.

The processor 120 may search a DPP configurator at operation S410. For example, if the processor 120 is in a state of storing identification information for the electronic apparatus (configurator) 200, the processor 120 may search the electronic apparatus 200 based on the identification information of the electronic apparatus 200.

The processor 120 may perform a process of configurator DPP access at operation S420. For example, if the electronic apparatus 200 is searched, the processor 120 may connect communication with the electronic apparatus 200.

If the processor 120 succeeds in DPP authentication at operation S430-Y, the processor 120 may access the access point using the information of the access point transmitted from the configurator at operation S440. The processor 120 may receive not only the information of the access point but also information on the access allowance time. If the processor 120 fails in DPP authentication at operation S430-N, the processor 120 may re-search a DPP configurator.

The processor 120 may identify whether the access allowance time was finished at operation S450. For example, if it is identified that the access point operates in a legacy standard based on the identification information of the access point, the processor 120 may identify whether the access allowance time was finished. If information on the access allowance time is received from the electronic apparatus 200, the processor 120 may identify that the access point operates in a legacy standard, and in accordance thereto, the processor 120 may identify whether the access allowance time was finished.

If the access allowance time is finished (S450-Y), the processor 120 may delete the stored information for the access point, and release access to the access point at operation S460.

FIG. 5 is a flowchart illustrating an example method for the electronic apparatus 200 to release access between the electronic apparatus 100 and the access point according to various embodiments.

The processor 220 searches a DPP enrollee at operation S510. For example, if identification information for the electronic apparatus (enrollee) 100 is acquired, the processor 220 may search the electronic apparatus 100 based on the identification information of the electronic apparatus 100.

The processor 220 may perform a process of DPP access with the electronic apparatus 100 at operation S520. For example, if the electronic apparatus 100 is searched, the processor 220 may connect communication with the electronic apparatus 100.

If the processor 220 succeeds in DPP authentication at operation S530—Y, the processor 220 may store the access allowance time of the electronic apparatus 100 at operation S540. If the processor 220 fails in DPP authentication at operation S530—N, the processor 220 may re-search a DPP enrollee.

The processor 220 may identify whether the access allowance time was finished at operation S550. For example, if it is identified that the access point operates in a legacy standard based on the identification information of the access point, the processor 220 may identify whether the access allowance time was finished.

If the access allowance time is finished (S550—Y), the processor 220 may request release of connection to the electronic apparatus 100 and the access point at operation S560. However, the disclosure is not limited thereto, and when the access allowance time is finished, the processor 220 may request release of connection to at least one of the electronic apparatus 100 or the access point. When the access allowance time is finished, the processor 220 may request release of connection to at least one apparatus connected to the electronic apparatus 200.

Figure 6:
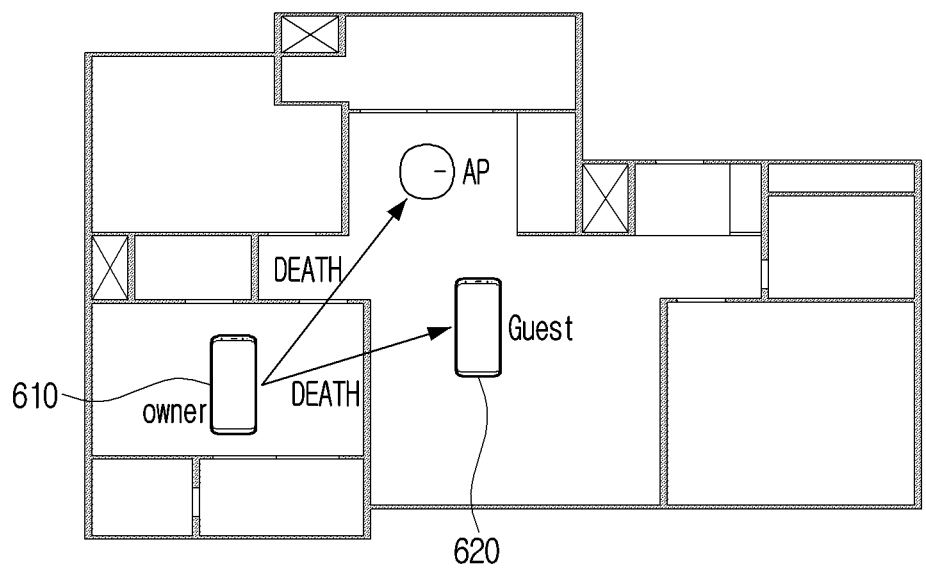
FIG. 6 is a diagram illustrating an example method of forceful release of access according to various embodiments.
Figure 7:
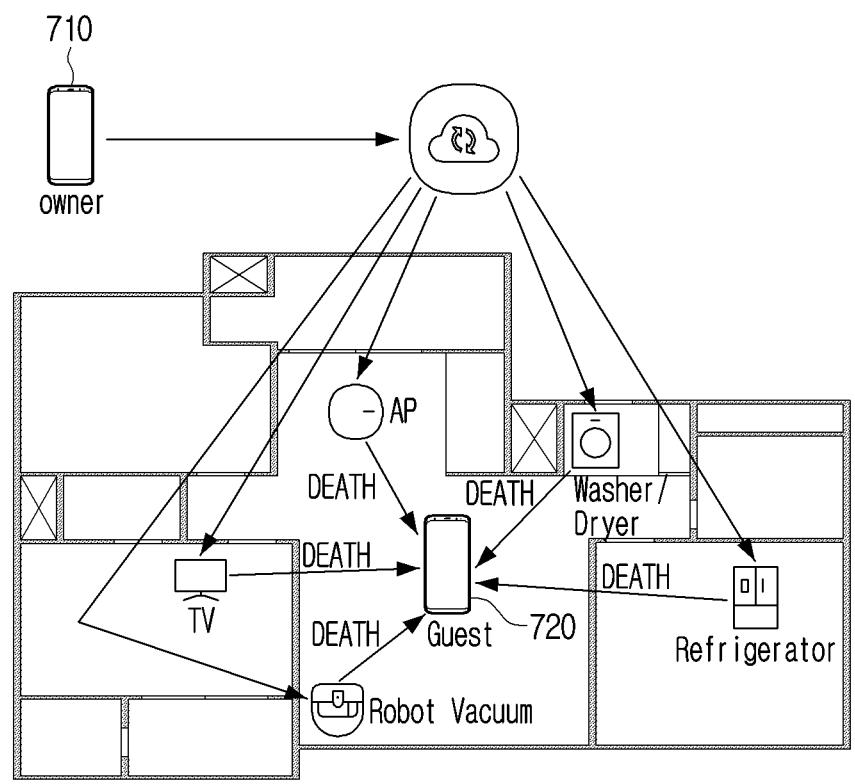
FIG. 7 is a diagram illustrating an example method of forceful release of access according to various embodiments.
Figure 8:
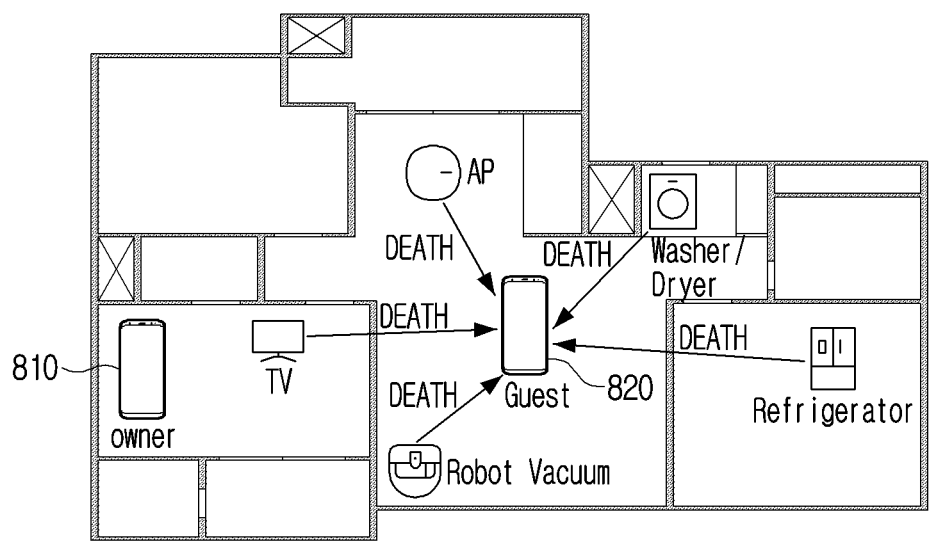
FIG. 8 is a diagram illustrating an example method of forceful release of access according to various embodiments.

FIGS. 6, 7 and 8 are diagrams illustrating example methods of forceful release of access according to various embodiments. In FIGS. 6, 7 and 8, the owner apparatus is the electronic apparatus (configurator) 200, and the guest apparatus is the electronic apparatus (enrollee) 100. In FIGS. 6, 7 and 8, the electronic apparatuses are described as an owner apparatus and a guest apparatus for convenience of explanation.

As illustrated in FIG. 6, if the access allowance time to the access point of the guest apparatus 620 passes, the owner apparatus 610 may transmit a control instruction for releasing access to the access point (death) to at least one of the access point or the guest apparatus 620.

In case the owner apparatus 610 transmitted a control instruction for releasing access to the access point (death) to the guest apparatus 620, the guest apparatus 620 may delete the identification information of the access point and thereby release access to the access point.

In case the owner apparatus 610 transmitted a control instruction for releasing access to the access point (death) to the access point, the access point may transmit a control instruction for deleting the identification information of the access point to the guest apparatus 620. The access point may ignore a packet transmitted from the guest apparatus 620.

As illustrated in FIG. 7, the owner apparatus 710 may be distanced from the access point by greater than or equal to a threshold distance, and it may be impossible that the owner apparatus 710 performs communication with the access point directly. In this case, the owner apparatus 710 may perform communication with the access point indirectly through a network such as the Internet.

If the access allowance time to the access point of the guest apparatus 720 passes, the owner apparatus 710 may transmit a control instruction for releasing access between the guest apparatus 720 and the access point (death) to at least one apparatus connected with the owner apparatus 710. The at least one apparatus may be connected with the owner apparatus 710 may include an apparatus that can perform communication with the owner apparatus 710 indirectly through a network. For example, the at least one apparatus connected with the owner apparatus 710 may include not only the access point but also various home appliances, and it may be any apparatus wherein communication with the owner apparatus 710 can be set in advance.

If indirect communication between the owner apparatus 710 and the guest apparatus 720 is in a connected state through a network, the owner apparatus 710 may transmit a control instruction for releasing access to the access point to the guest apparatus 720.

The owner apparatus 610 may control access to the access point of the guest apparatus 620 within an area wherein direct communication with the access point is possible through a method as illustrated in FIG. 6. The owner apparatus 710 may control access to the access point of the guest apparatus 720 in an area wherein indirect communication with the access point is possible through a cloud method as illustrated in FIG. 7.

As illustrated in FIG. 8, if a user instruction for blocking access of the guest apparatus 820 to the access point is received, the owner apparatus 810 may transmit an instruction for controlling to release access between the guest apparatus 820 and the access point to at least one apparatus connected with the owner apparatus 810.

The owner apparatus 810 may store a black list for apparatuses of which access to the access point is restricted in advance. In this case, the owner apparatus 810 may detect access to the access point of the guest apparatus 820, and transmit an instruction for controlling to release access between the guest apparatus 820 and the access point to at least one apparatus connected with the owner apparatus 810.

The at least one apparatus connected with the owner apparatus 810 may refer, for example, to an apparatus connected by a D2D method but not a cloud method, and the apparatus may include the access point. In this case, the owner apparatus 810 may transmit an action frame to the at least one apparatus connected with the owner apparatus 810 and thereby release access between the guest apparatus 820 and the access point. The action frame may include information on the apparatus of which access allowance time was finished.

Through the various example methods described above, access to the access point may be released.

FIG. 9 is a diagram illustrating an example of utilization according to various embodiments.

The top of FIG. 9 illustrates and example wherein a user visited a hotel lobby. The hotel may have prepared an automation apparatus so that the user can check in without the staff. The user may check in through the automation apparatus, and at the same time, input information on the electronic apparatus from which the user wishes to be provided with a communication service. For example, at the same time as checking-in, the user may make a QR code or a character string including identification information of the electronic apparatus read by the automation apparatus.

The automation apparatus may provide information on the access point to the electronic apparatus of the user. Then, the automation apparatus may provide access allowance information for the electronic apparatus of the user to at least one home appliance inside the hotel room of the user.

As illustrated in the center of FIG. 9, when the user enters the hotel room of the user, the electronic apparatus may connect communication to the access point based on the information on the access point.

As illustrated at the bottom of FIG. 9, when the threshold time passes based on the access allowance information, the at least one home appliance inside the hotel room may release access for the electronic apparatus.

In FIG. 9, a hotel was suggested as an example, but the method as above can be applied in numerous various places. For example, a user may access an access point inside a café while ordering coffee in the café by providing identification information for the electronic apparatus of the user. When the threshold time passes, access to the access point may be released.

Through the method as above, an access allowance time of an external apparatus for an access point may be restricted.

Figure 10:
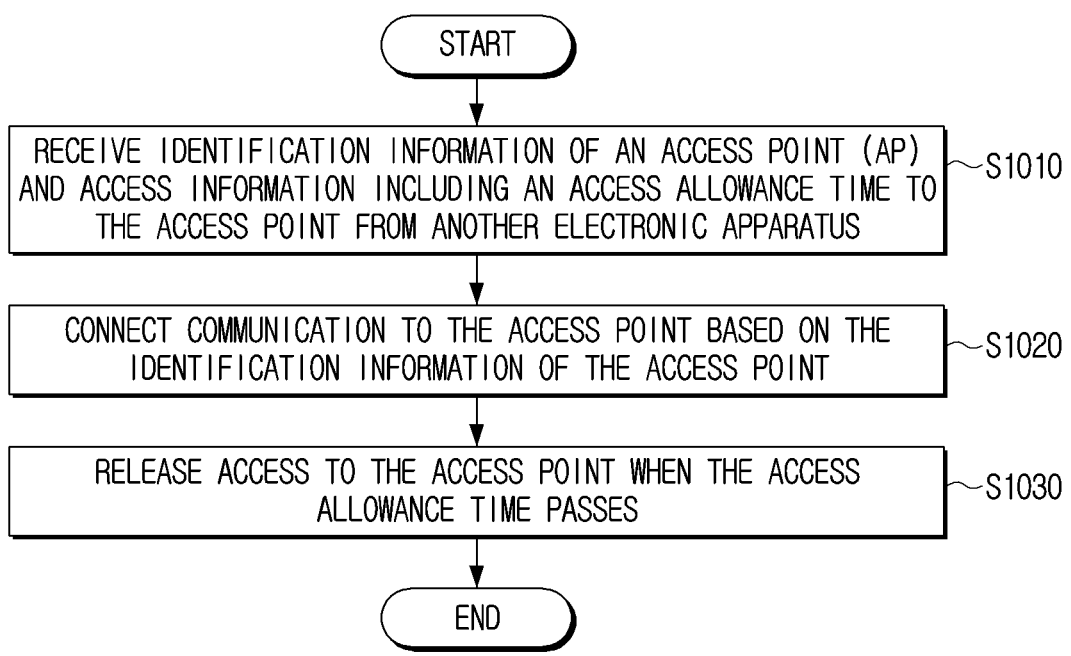
FIG. 10 is a flowchart illustrating an example method of controlling an electronic apparatus (enrollee) according to various embodiments.

FIG. 10 is a flowchart illustrating an example method of controlling the electronic apparatus 100 according to various embodiments.

Identification information of the access point and access information including an access allowance time to the access point are received from the electronic apparatus 200 at operation S1010. Communication is connected to the access point based on the identification information of the access point at operation S1020. When the access allowance time passes, access to the access point is released at operation S1030.

The control method may further include an operation of identifying the operation type of the access point based on the identification information of the access point, and at the operation S1030 of releasing, if it is identified that the access point operates in a legacy standard, the identification information of the access point may be deleted after the access allowance time passes, and access to the access point may thereby be released.

The control method may further include an operation of receiving an instruction for release of access from the electronic apparatus 200 after the access allowance time passes, and at the operation of releasing, access to the access point may be released based on the instruction for release of access, and the identification information of the access point may be deleted.

The control method may further include an operation of receiving an instruction for release of access from at least one apparatus connected with the electronic apparatus 200 after the access allowance time passes, and at the operation S1030 of releasing, access to the access point may be released based on the instruction for release of access, and the identification information of the access point may be deleted.

At the operation S1010 of receiving access information, identification information of the electronic apparatus 100 may be provided to the electronic apparatus 200 in at least one of a form of a QR code or a form of a character string, and access information may be received from the electronic apparatus 200.

Figure 11:
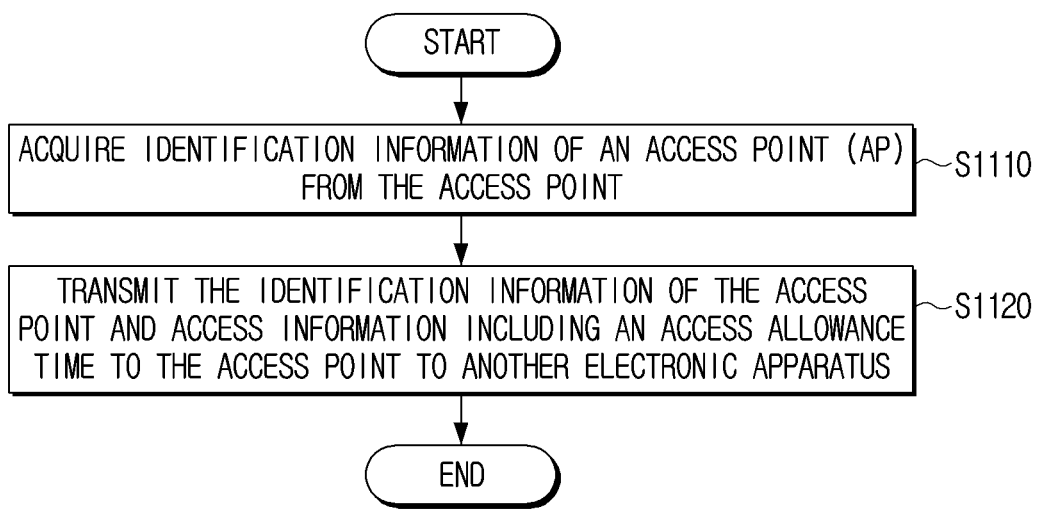
FIG. 11 is a flowchart illustrating an example method of controlling an electronic apparatus (configurator) according to various embodiments.

FIG. 11 is a flowchart illustrating an example method of controlling the electronic apparatus 200 according to various embodiments.

Identification information of an access point is acquired from the access point at operation S1110. The identification information of the access point and access information including an access allowance time to the access point are transmitted to the electronic apparatus 100 at operation S1120. The method may further include an operation of, based on identifying that the access point operates in a legacy standard based on the identification information of the access point, including a control instruction for releasing access to the access point after the access allowance time passes in the access information and transmitting the access information, or based on identifying that the access point operates in a legacy standard based on the identification information of the access point, transmitting a control instruction for releasing access to the access point to the electronic apparatus 100 after the access allowance time passes.

The method may further include an operation of, based on the access allowance time passing after transmitting the access information to the electronic apparatus 100, transmitting an instruction for blocking access for the electronic apparatus 100 to the access point.

The operation S1120 of transmitting, if identification information of the electronic apparatus 100 is acquired in a form of a QR code or a form of a character string, connection of communication with the electronic apparatus 100 may be performed, and the access information may be transmitted to the electronic apparatus 100.

The method may further include an operation of, based on the access allowance time passing after transmitting the access information to the electronic apparatus 100, identifying whether connection of communication with the electronic apparatus 100 is maintained, and an operation of, based on the connection of communication with the electronic apparatus 100 being in a released state, transmitting a command for controlling at least one apparatus connected with the electronic apparatus 200 to release access between the electronic apparatus 100 and the access point to the at least one apparatus.

At the operation of transmitting to the at least one apparatus, the identification information for the electronic apparatus 100 may be transmitted to the at least one apparatus.

According to various example embodiments of the disclosure as described above, after an electronic apparatus (enrollee) may be connected to an access point, when the access allowance time passes, access to the access point is released, and accordingly, the access allowance time of the electronic apparatus (enrollee) can be restricted even in case the access point operates in a legacy standard.

After an electronic apparatus (configurator) controls the electronic apparatus (enrollee) to be connected to the access point, when the access allowance time passes, connection of communication between the electronic apparatus (enrollee) and the access point is released directly or indirectly, and accordingly, the access allowance time of the electronic apparatus (enrollee) can be restricted.

According to an embodiment, the various example embodiments described above may be implemented as software including instructions stored in machine-readable storage media, which can be read by machines (e.g., computers). The machines refer to apparatuses that call instructions stored in a storage medium, and can operate according to the called instructions, and the apparatuses may include an electronic apparatus according to the aforementioned embodiments (e.g.: an electronic apparatus A). In case an instruction is executed by a processor, the processor may perform a function corresponding to the instruction by itself, or using other components under its control. An instruction may include a code generated by a compiler or a code executable by an interpreter. A storage medium that is readable by machines may be provided in the form of a non-transitory storage medium. The 'non-transitory' storage medium may not include signals, and is tangible, but does not indicate whether data is stored in the storage medium semi-permanently or temporarily.

According to an embodiment, the method according to the various embodiments described above may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g., Playstore™). In the case of on-line distribution, at least a portion of a computer program product may be stored in a storage medium such as the server of the manufacturer, the server of the application store, and the memory of the relay server at least temporarily, or may be generated temporarily.

In addition, according to an embodiment, the various example embodiments described above may be implemented in a recording medium that can be read by a computer or an apparatus similar to a computer using software, hardware or a combination thereof. In some cases, the embodiments described in this specification may be implemented as the processor itself. According to an example implementation by software, the embodiments such as procedures and functions described in this disclosure may be implemented as separate software modules. Each of the software modules may perform one or more functions and operations described in this specification.

Computer instructions for performing processing operations of machines according to the aforementioned various example embodiments may be stored in a non-transitory computer-readable medium. Computer instructions stored in such a non-transitory computer-readable medium make the processing operations at machines according to the aforementioned various embodiments performed by a specific machine, when the instructions are executed by the processor of the specific machine. A non-transitory computer-readable medium may refer, for example, to a medium that stores data semi-permanently, and is readable by machines. As examples of a non-transitory computer-readable medium, there may be a CD, a DVD, a hard disc, a blue-ray disc, a USB, a memory card, a ROM and the like.

Also, each of the components according to the aforementioned various embodiments (e.g., a module or a program) may include a singular object or a plurality of objects. Further, among the aforementioned corresponding sub components, some sub components may be omitted, or other sub components may be further included in the various embodiments. Alternatively or additionally, some components (e.g.: a module or a program) may be integrated as an object, and perform the functions that were performed by each of the components before integration identically or in a similar manner Operations performed by a module, a program, or other components according to the various embodiments may be executed sequentially, in parallel, repetitively, or heuristically. Or, at least some of the operations may be executed in a different order or omitted, or other operations may be added.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. An electronic apparatus comprising:
a communication interface comprising circuitry; and
a processor connected with the communication interface and configured to control the electronic apparatus,
wherein the processor is configured to:
based on identification information of an access point and access information including an access allowance time to the access point being received from another electronic apparatus through the communication interface, control the electronic apparatus to connect communication to the access point based on the identification information of the access point, and
based on the access allowance time passing, release access to the access point wherein the processor is further configured to:
identify an operation type of the access point based on the identification information of the access point, and
based on identifying that the access point operates in a legacy standard, delete the identification information of the access point after the access allowance time is passed and release access to the access point.

2. The electronic apparatus of claim 1,
wherein the processor is configured to:
based on receiving an instruction for release of access from the another electronic apparatus through the communication interface based on the access allowance time passing, release access to the access point based on the instruction for release of access, and delete the identification information of the access point.

3. The electronic apparatus of claim 1,
wherein the processor is configured to:
based on receiving an instruction for release of access from at least one apparatus connected with the another electronic apparatus through the communication interface based on the access allowance time passing, release access to the access point based on the instruction for release of access, and delete the identification information of the access point.

4. The electronic apparatus of claim 1,
wherein the processor is configured to:
provide identification information of the electronic apparatus to the another electronic apparatus as at least one of a QR code or a character string, and receive the access information from the another electronic apparatus through the communication interface.

5. An electronic apparatus comprising:
a communication interface comprising circuitry; and
a processor configured to control the electronic apparatus to:
acquire identification information of an access point from the access point, and
control the communication interface to transmit the identification information of the access point and access information including an access allowance time to the access point to another electronic apparatus,
wherein the processor is configured to:
identify an operation type of the access point based on the identification information of the access point,
based on identifying that the access point operates in a legacy standard based on the identification information of the access point, include a control instruction in the access information, the control instruction comprising a control instruction for deleting the identification information of the access point and releasing access to the access point after the access allowance time is passed, or
after the access time is passed, control the communication interface to transmit a control instruction for deleting the identification information of the access point and releasing the access to the access point to the another electronic apparatus.

6. The electronic apparatus of claim 5,
wherein the processor is configured to:
based on the access allowance time passing after transmitting the access information to the another electronic apparatus, control the communication interface to transmit an instruction for blocking access for the another electronic apparatus to the access point.

7. The electronic apparatus of claim 5,
wherein the processor is configured to:
based on identification information of the another electronic apparatus being acquired as a QR code or as a character string, perform connection of communication with the another electronic apparatus, and control the communication interface to transmit the access information to the another electronic apparatus.

8. The electronic apparatus of claim 7,
wherein the processor is configured to:
based on the access allowance time passing after transmitting the access information to the another electronic apparatus, identify whether connection of communication with the another electronic apparatus is maintained, and
based on the connection of communication with the another electronic apparatus being in a released state, control the communication interface to transmit an instruction for controlling at least one apparatus connected with the electronic apparatus to release access between the another electronic apparatus and the access point to the at least one apparatus.

9. The electronic apparatus of claim 8,
wherein the processor is configured to:
based on the connection of communication with the another electronic apparatus being in a released state, control the communication interface to transmit the identification information for the another electronic apparatus to the at least one apparatus.

10. The electronic apparatus of claim 5,
wherein the processor is configured to:
based on an instruction for blocking access of the another electronic apparatus to the access point being received, control the communication interface to transmit an instruction for controlling to release access between the another electronic apparatus and the access point to the access point or at least one apparatus connected with the electronic apparatus.

11. A method of controlling an electronic apparatus, the method comprising:
receiving identification information of an access point and access information including an access allowance time to the access point from another electronic apparatus;
connecting communication to the access point based on the identification information of the access point; and
based on the access allowance time passing, releasing access to the access point;
identifying an operation type of the access point based on the identification information of the access point;
based on identifying that the access point operates in a legacy standard, deleting the identification information of the access point after the access allowance time is passed and releasing access to the access point.

12. The method of claim 11, further comprising:
receiving an instruction for release of access from the another electronic apparatus based on the access allowance time passing,
wherein the releasing comprises:
  releasing access to the access point based on the instruction for release of access, and deleting the identification information of the access point.

13. The method of claim 11, further comprising:
receiving an instruction for release of access from at least one apparatus connected with the another electronic apparatus based on the access allowance time passing,
wherein the releasing comprises:
  releasing access to the access point based on the instruction for release of access, and deleting the identification information of the access point.

14. The method of claim 11,
wherein the receiving access information comprises:
  providing identification information of the electronic apparatus to the another electronic apparatus as at least one of a QR code or a character string, and receiving the access information from the another electronic apparatus.

* * * * *